(12) United States Patent
Kamei et al.

(10) Patent No.: US 7,653,935 B2
(45) Date of Patent: Jan. 26, 2010

(54) FILE SERVER FOR TRANSLATING USER IDENTIFIER

(75) Inventors: Hitoshi Kamei, Yokohama (JP);
Masaaki Iwasaki, Tachikawa (JP);
Takahiro Nakano, Yokohama (JP); Yoji Nakatani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 966 days.

(21) Appl. No.: 11/110,808

(22) Filed: Apr. 21, 2005

(65) Prior Publication Data
US 2006/0206928 A1    Sep. 14, 2006

(30) Foreign Application Priority Data
Mar. 10, 2005    (JP)    ............................. 2005-066508

(51) Int. Cl.
*G06F 7/04*      (2006.01)
*G06F 15/16*     (2006.01)
*G06F 17/30*     (2006.01)
*H04L 29/06*     (2006.01)

(52) U.S. Cl. .......................................... 726/6; 726/21
(58) Field of Classification Search ................... 726/6, 726/21
See application file for complete search history.

(56) References Cited

U.S. PATENT DOCUMENTS

| | | | | |
|---|---|---|---|---|
| 5,274,816 A | * | 12/1993 | Oka ................................ | 713/2 |
| 5,327,531 A | * | 7/1994 | Bealkowski et al. ........... | 714/6 |
| 5,519,969 A | * | 5/1996 | Golba ............................. | 52/60 |
| 5,537,543 A | * | 7/1996 | Itoh et al. ....................... | 714/48 |
| 5,754,848 A | * | 5/1998 | Hanes ............................ | 707/200 |
| 5,787,487 A | * | 7/1998 | Hashimoto et al. ........... | 711/165 |
| 5,860,122 A | * | 1/1999 | Owada et al. ................. | 711/162 |
| 6,377,952 B1 | * | 4/2002 | Inohara et al. ................ | 707/101 |
| 6,385,606 B2 | * | 5/2002 | Inohara et al. ................ | 707/4 |
| 2001/0039622 A1 | * | 11/2001 | Hitz et al. ..................... | 713/201 |
| 2004/0030731 A1 | * | 2/2004 | Iftode et al. .................. | 707/205 |

OTHER PUBLICATIONS

"Lightweight Directory Access Protocol", Network Working Group, W. Yeong, et al, rfc1777, pp. 1-14.
"NFS: Network File System Protocol Specification", Network Working Group, Sun Microsystems, Inc. Mar. 1989, rfc1094, pp. 1-18.

* cited by examiner

*Primary Examiner*—Michael J Simitoski
*Assistant Examiner*—Dant B Shaifer Harriman
(74) *Attorney, Agent, or Firm*—Antonelli, Terry, Stout & Kraus, LLP.

(57) ABSTRACT

Upon integration of a file system, user identifier recorded in a storage as management data is translated. A file server connected to a storage storing the data of a file system therein has a file system operation unit for managing the file system, a file server operation unit for receiving the access request to the file, and a user identifier translation unit for carrying out translation between first user identifier, which is used by the client and second user identifier, which is recorded in the storage as management data of the file system. Receiving the access request to the file from the client, the user identifier translation unit translates the second user identifier included in the management data of the file that is an access target of the access request into the first user identifier, and the file server operation unit transmits the management data to the client.

3 Claims, 12 Drawing Sheets

FIG. 1
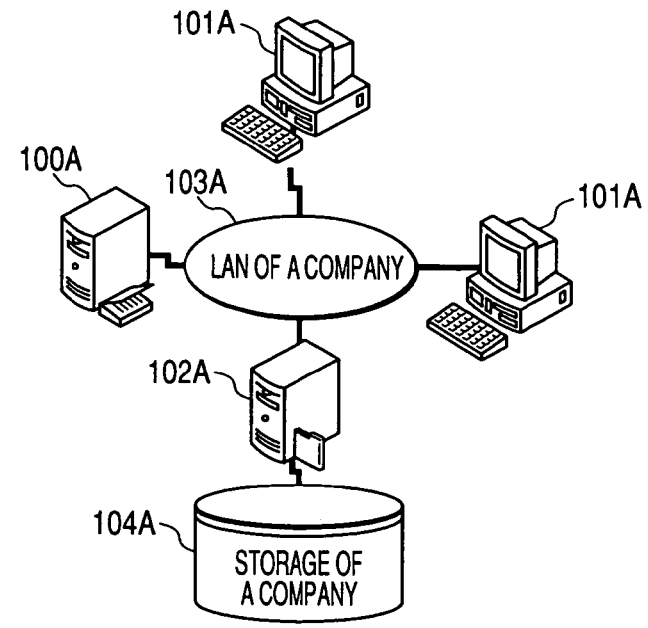
FILE SHARING SYSTEM OF A COMPANY
BEFORE INTEGRATION
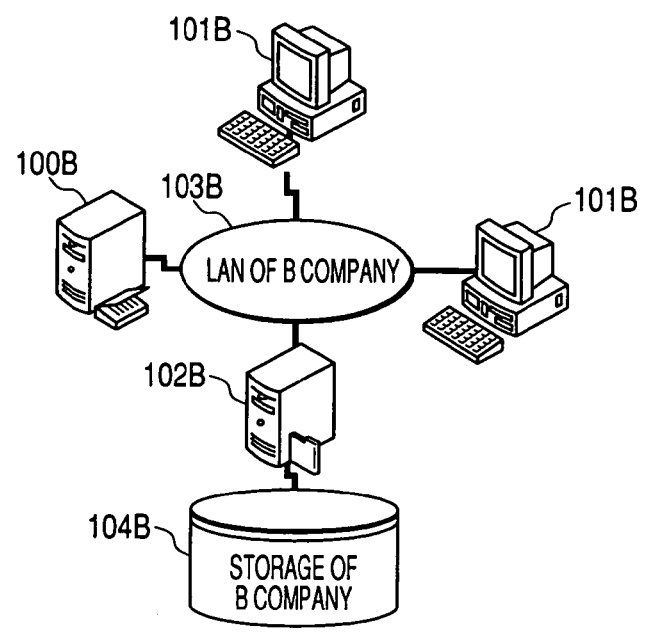
FILE SHARING SYSTEM OF B COMPANY
BEFORE INTEGRATION

FILE SHARING SYSTEMS OF A AND B COMPANIES AFTER INTEGRATION

FILE SERVER FOR TRANSLATING USER IDENTIFIER

CROSS-REFERENCES TO RELATED APPLICATIONS

This application relates to and claims priority from Japanese Patent Application No. 2005-066508, filed on Mar. 10, 2005, the entire disclosure of which is incorporated herein by reference.

BACKGROUND

The present invention relates to a file sharing system using a network, and particularly, the present invention relates to a user management method in the file sharing system.

DESCRIPTION OF THE RELATED ART

There is a file sharing system such that a plurality of clients accesses a file sharing server via a network to access a file that is managed by the file sharing server. In the file sharing system, there is a case that the identifier called as a UID (User ID) that is unique within the file sharing system is given to each user in order to manage a user who accesses the file and the UID is managed by a user management server. In addition, the UID is used for checking if the user has access authority to the file in the file sharing server or not.

In a no-patent document 1 (W. Yeog and other two, "Lightweight Directory Access Protocol (LDAP)", URL:http://rfc-.net/rfc1777.txt), a method to generally manage the UID by using the user management server is disclosed, and in a no-patent document 2 ("Network File System Protocol Specification (NFS")", URL:http://rfc.net/rfc1094.txt), it is disclosed that access to the file is controlled by using the UID.

When the file sharing system is constructed, for example, for each company, it may be necessary that a plurality of file sharing systems is integrated to construct one file sharing system due to integration of the companies. Thus, when a plurality of file sharing systems is integrated to construct one file sharing system, it is necessary that the UID of each user that is managed by the integrated file sharing system is the user identifier that can specify the user uniquely within the integrated file sharing system. If the integrated file sharing system successively uses the UID that has been used in the file sharing system before integration, there is a possibility that uniqueness of the UID is not insured, so that there is a case that a new UID is given to the user in the integrated file sharing system.

If the UID given to each user due to integration of the file sharing systems is changed, the file sharing server necessarily changes the UID that is used as the management information such as the access control information with respect to each file. However, in many cases, the integrated file sharing system is a large size in integration of the file sharing system due to integration of the company, so that the number of UID that the file sharing server should change is also increased.

SUMMARY

Therefore, in the file sharing system, even if the UID given to the user is changed, a system such that the file sharing server does not have to change the UID that is used as the management information of the file is expected.

A system has a storage storing the data of a file system therein, a file sharing server that is connected to the storage, and a client for requesting access to a file from the file sharing server. The file sharing server has a file system operation unit for managing the data of the file system that is stored in the storage; a file server operation unit for receiving the access request to the file from the client; and a user identifier translation unit for carrying out translation between first user identifier for identifying a user of the file system, which is used by the client and second user identifier, which is recorded in the storage as management data of the file system. When the file server operation unit receives the access request to the file from the client, the user identifier translation unit translates the second user identifier included in the management data of the file that is an access target of the access request into the first user identifier, and the file server operation unit transmits the management data including the translated first user identifier to the client.

Even if the UID given to the user of the file sharing system is changed, it is not necessary that the value of the UID recorded as the management information of the file system is changed.

BRIEF DESCRIPTION OF THE DRAWINGS

FIG. 1 illustrates an example of a file sharing system of an A company before integration and a file sharing system of a B company before integration.

DETAILED DESCRIPTION OF AN EMBODIMENT

Figure 2:
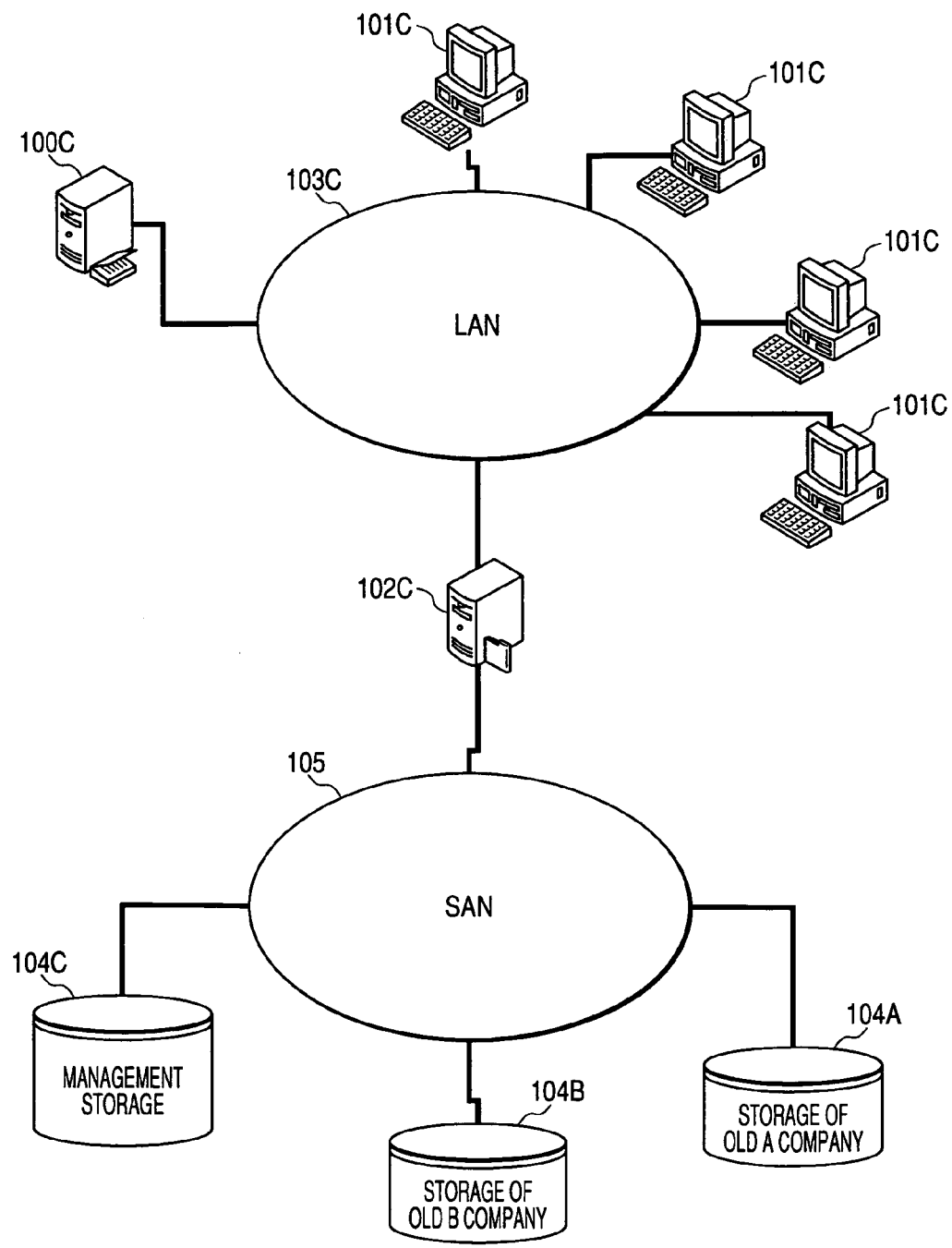
FIG. 2 illustrates an example of a file sharing system after integration.

Hereinafter, taking a case that a file sharing system of an A company and that of a B company are integrated by one file sharing system due to integration of the A company (referred to as "the A company" hereinafter) and the B company (referred to as "the B company" hereinafter) as an example, an embodiment according to the present invention will be described below. In the meantime, the present invention is applicable not only to integration of the file sharing system due to integration of the companies but also to a general case that the UID of each user is changed due to integration of the file sharing systems. In addition, the embodiment described below is an example and the present invention is not limited to this embodiment.

FIG. 1 illustrates an example of a file sharing system of an A company before integration and a file sharing system of a B company before integration.

In a file sharing system of the A company before integration, a user management server of the A company 104A, one or plural clients of the A company 101A, and a file sharing server of the A company 102A are connected via a LAN (Local Area Network) of the A company 103A to communicate with each other. In addition, a storage system of the A company 104A is connected to the file sharing server of the A company 102A.

Each of the plural clients of the A company 101A is a terminal that is used by a user of the A company and it becomes a client of the user management server of the A company 100A and the file sharing server of the A company 102A. In the meantime, the number of the clients of the A company 101A connected to the LAN of the A company 103A is not limited to the example shown in FIG. 1.

The user management server of the A company 100A is a server to manage the user using the client of the A company 101A connected to the LAN of the A company 103A. Specifically, the user management server of the A company 100A may manage the UID that is unique within the file sharing system of the A company that is given to the user of the file sharing system of the A company. Then, the user management server of the A company 100A may receive the authentication information such as a user name and a pass word inputted in the client of the A company 101A from this client of the A company 101A when the user of the A company logs on the client of the A company 101A so as to carry out the authentication operation of the user, and it may return an authentication result (namely, availability of login) to this client of the A company 101A.

The file sharing server of the A company 102A serves as a file server to provide a file sharing service to each of the clients of the A company 101A. In other words, the file sharing server of the A company 102A may manage the file system of the A company and receiving the access request to the file from each of the clients of the A company 10A, it may carry out the requested access operation to the file and may return its result to this client of the A company 101A that requires the operation. In the meantime, the data of the file system managed by the file sharing server of the A company 102A (including both of the data of a file and a directory and the management data of a file system such as access limitation information to the file and the directory) is stored within the storage system of the A company 104A that is connected to the file sharing server of the A company 102A. Accordingly, receiving the access request to the file from the client of the A company 101A, the file sharing server of the A company 102A may access the data stored within the storage system of the A company 104A to carry out the requested access operation to the file. The storage system of the A company 104A may be a hard disk device, a tape device, and an optical devices or the like, and may be a disk array system that controls a plurality of hard disk devices by a disk controller and configures a logical device having a redundant structure by using a plurality of hard disk devices.

Since the structure of the file sharing system of the B company before integration is the same as that of the file sharing system of the A company before integration, its description is herein omitted.

FIG. 2 illustrates an example of a file sharing system after the file sharing system of the A company and the file sharing system of the B company are integrated by integration of the A company and the B company.

In the file sharing system after integration, one or plural clients 101C, a user management server 100C, and a file sharing server 102C are connected to communicate with each other through a LAN 103C. Further, the file sharing server 102C, the storage system of the old A company 104A, a storage system of the old B company 104B, and a management storage system for managing the file sharing system after integration 104C are connected via a Storage Area Network (hereinafter, referred to as a SAN) 105 to communicate with each other.

Each of the plural clients 101C is a terminal that is used by the user who is using the file system after integration and it becomes a client of the user management server 100C and the file sharing server 102C. In the meantime, the number of the client 101C connected to the LAN 103C is not limited to the example shown in FIG. 2.

The user management server 100C is a server to manage the user who uses the client 101C that is connected to the LAN 103C, namely, the server to manage the user of the file sharing system after integration. In this case, after integration of the A company and the B company, a UID is newly given to the user (hereinafter, referred to as a new UID). Accordingly, the user of the file sharing system after integration may use the new UID that is newly given to the user other than the UID that is given to the user in the file sharing system of the A company before integration or the file sharing system of the B company before integration. This is because the UID is duplicated among the plural users if the UID used in the file sharing system before integration is successively used also in the file sharing system after integration when the UID of a certain user used in the file sharing system of the A company before integration has the same value as that of the UID of a certain user used in the file sharing system of the B company before integration, so that there is a possibility that the file sharing system after integration cannot specify the user uniquely using the UID. The user management server 100C may manage the new UID that is newly given to the user in order to uniquely identify the user in the file sharing system after integration. Then, by using the new UID, the authentication operation upon login of the user is carried out.

The file sharing server 102C is a file server to provide the file sharing service to each client 101C in the file sharing server after integration. The file sharing server 102C may integrate the file system of the old A company managed by the file sharing server of the old A company 102A (hereinafter, also referred to as a sub file system of the old A company) and the file system of the old B company managed by the file sharing server of the old B company 102B (hereinafter, also referred to as a sub file system of the old B company) and manage it as one file system, then, the file sharing server 102C may carry out the access operation to the file and return the result to the client 101C when receiving the access request to this file system from the client 101C. In the meantime, the data of the file system managed by the file sharing server 102C (including both of the data of a file and a directory and the management data of a file system such as access limitation information to the file and the directory) is stored within the storage systems 104A, 104B, and 104C that is connected to the file sharing server 102C via the SAN 105.

According to the present embodiment, it is defined that the storage system of the old A company 104A and the storage system of the old B company 104B can be also used in the file sharing system after integration. In other words, the storage system of the old A company 104A that is connected to the file sharing server 102C via the SAN 105 is equivalent to the storage system of the old A company 104A before integration in FIG. 1 and in the storage system of the old A company 104A, the data of the file system of the old A company (namely, the data of the sub file system of the old A company) is stored. In the same way, the storage system of the old B company 104B is equivalent to the storage system of the old B company 104B before integration in FIG. 1 and in the storage system of the old B company 104B, the data of the file system of the old B company (namely, the data of the sub file system of the old B company) is stored. Accordingly, as the management information of the file system stored in the storage system of the old A company 104A and the storage system of the old B company 104B (for example, the access limitation information to the file or the like), the UID in the old A company and the old B company before integration (hereinafter, referred to as the old UID) are used.

To the SAN 105, the management storage system 104C is also connected other than the storage system of the old A company 104A and the storage system of the old B company 104B. In the management storage system 104C, the management data that is necessary for the file sharing server 102C to integrally manage the sub file system of the old A company and the sub file system of the old B company is stored. Further, in the management storage system 104C, the information of a file system that is newly created in the file sharing system after integration may be stored other than the management data. In addition, the management data may be stored in the storage system of the old A company 104A or the storage system of the old B company 104B. The management storage system 104C may be a hard disk device, a tape device, and an optical disk or the like or a disk array system as same as the storage system of the old A company 104A and the storage system of the old B company 104B.

Figure 3:
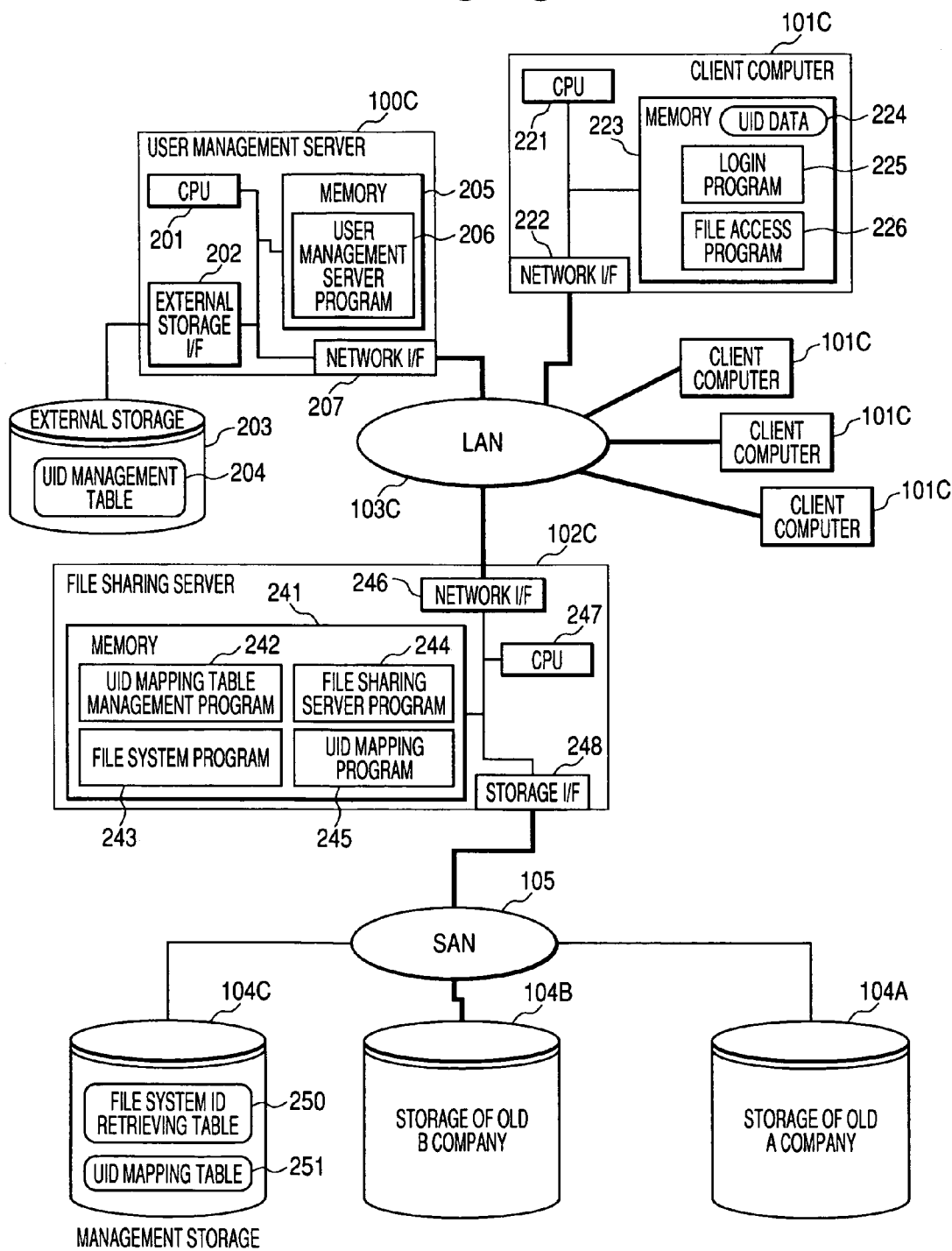
FIG. 3 illustrates a structural example of the file sharing system after integration.

FIG. 3 illustrates a structural example of a file sharing system after integration.

The client 101C has a network interface control unit (hereinafter, referred to as a network I/F) 222 and a memory 223 to be connected to a processor (hereinafter, referred to as a CPU) 221 and the LAN 103C, and these are connected to communicate with each other by an internal communication path.

A login program 225 stored in the memory 223 is a program for carrying out the authentication operation of the user using the client 101C to be executed by the CPU 221. If the login program 225 is executed, the CPU 221 may transmit the inputted user name and pass word to the client 101C together with the authentication request and receiving the authentication result from the user management server 100C, the CPU 221 may output it. In the meantime, if the login of the user is permitted as a result of the authentication operation by the user management server 100C, the client 101C may receive the UID of the user from the user management server 100C. Therefore, in the memory 223, a memory area (a UID data area) 224 for storing the UID of this user that is received from the user management server 100C is provided.

A file access program 226 stored in the memory 223 is a program to be executed by the CPU 221 for accessing the file of the file system that is managed by the file sharing server 102C.

The user management server 100C has a CPU 201, an external storage interface control unit (hereinafter, referred to as an external storage I/F apparatus) 202 to be connected to an external storage 203, a memory 205, and a network I/F 207 to be connected to the LAN 103C, and these are connected to communicate with each other by the internal communication path.

The external storage 203 is a disk device such as a hard disk and an optical disk, and in the external storage 203, a UID management table 204 is stored. In the meantime, the external storage 203 may be a disk array system.

A user management server program 206 stored in the memory 205 is a program to be executed by the CPU 201 for managing the UID. The request to the user management server program 206 is transmitted from the client 101C to the user management server 100C via the LAN 103C and the network I/F 207. Then, when the user management server program 206 is executed by the CPU 201, the CPU 201 may retrieve the UID management table 204 that is stored in the external storage 203 in response the received request and may execute the operation for transmitting the UID registered in the UID management table 204 to the client 101C.

The file sharing server 102C has a CPU 247, a memory 241, a network I/F 246 to be connected to the LAN 103C, and a storage interface control unit (hereinafter, referred to as a storage I/F) 248 to be connected to the SAN 105, and these are connected to communicate with each other by the internal communication path.

If a file sharing server program 244 stored in the memory 241 is executed by the CPU 247, the file sharing server 102C may receive and execute a request to a file system that is managed by the file sharing server 102C from the client 101C and then, it may return the operation result to the client 101C.

A file system program 243 stored in the memory 241 is a program to be executed by the CPU 247 in order to manage the sub file system of the old A company constructed within the storage system 104 of the old A company and the sub file system of the old B company constructed within the storage system 104B of the old B company by using the data of the sub file system of the old A company stored in the storage system of the old A company 104A and the data of the sub file system of the old B company stored in the storage system of the old B company 104B. As described above, since the management information of the file system using the old UID before integration is stored in the storage system of the old A company 104A and the storage system of the old B company 104B, the file system program 243 may manage the files of the sub file system of the old A company and the sub file system of the old B company by using the old UID before integration.

A UID mapping program 245 stored in the memory 241 is a program to be executed by the CPU 247 in order to translate the new UID after integration into the old UID before integration used as the management data of the sub file system stored in the storage system of the old A company 104A and the storage system of the old B company 104B. When the UID mapping program 245 is executed by the CPU 247, a file system ID table 250 stored in the management storage system 104C and a UID mapping table 251 are referred and the translation operation between the new UID and the old UID is carried out. In the meantime, since the new UID is the UID to be used by the user of the file sharing system after integration, the client 101C used by this user, and the user management server 100C or the like, the new UID is called as "a user side UID", and since the old UID is the UID to be used by the file system program 243 for managing the sub file system of the old A company and the sub file system of the old B company, the old UID is called as "a file system side UID".

A UID mapping table management program 242 stored in the memory 241 is a program to be executed by the CPU 247 for managing the file system ID table 250 stored in the management storage system 104C and the UID mapping table 251.

Figure 4:
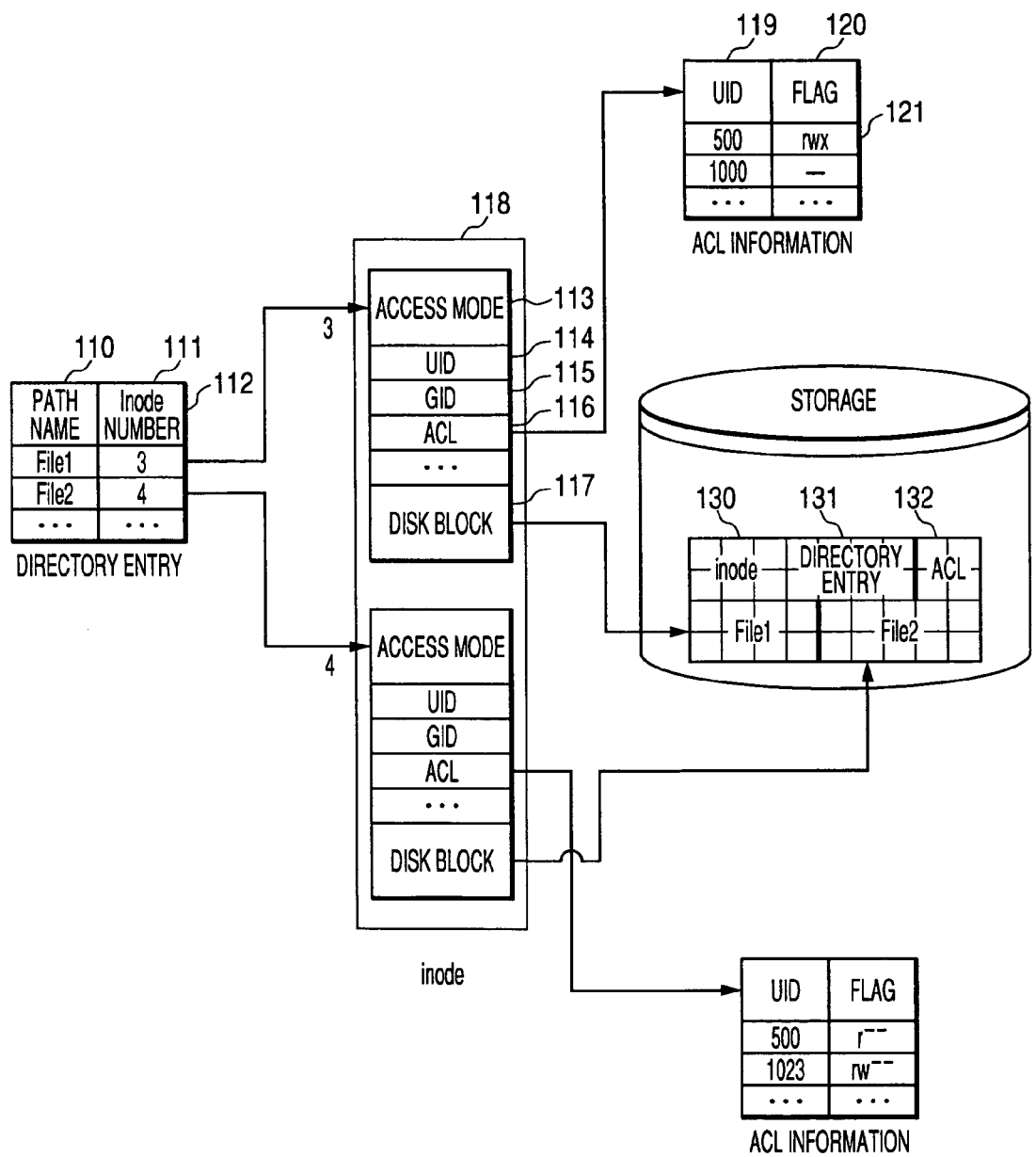
FIG. 4 illustrates an example of the data of a sub file system of an old A company.

FIG. 4 illustrates an example of the data of a sub file system of an old A company (including the data of the file and the directory and the management data of the file system) stored in the storage system of the old A company 104A.

In the data of the sub file system of the old A company, a directory entry 112, inode information 118, ACL information 121, and the data of each file are included. Within the storage system of the old A company 104A, an inode information storage area 130, a directory entry storage area 131, and an ALC information storage area 132 are provided, and in each area, the inode information 118, the directory entry 112, and the ACL information 121 are stored. In addition, in other areas, the data of each file is stored.

The directory entry 112 has a path name 110 of the directory and the file belonging to the sub file system of the old A company and an inode number 111 allocated to this directory or the file. The inode number 111 is the information indicating an address in a storage area storing the inode information of the corresponding file or directory therein, and if the storage area indicated by the inode number is referred, the inode information 118 of the file or the directory corresponding to this inode number can be referred.

The inode information 118 has the inode information of each directory and each file belonging to the sub file system of the old A company. In the inode information of each directory and each file, access mode information 113, UID information 114, GID information 115, ACL 116, and a disk block address 117 are included.

The UID information 114 is the information to indicate the UID of the user having the file or the directory. When creating the file and the directory, the UID of a creator is registered in the inode information 118 as the UID information 114, however, the UID information 114 may be changed after that. The GID information 115 is the information to indicate the authentication information of a group to which the file or the directory belongs.

The access mode information 113 is the information to indicate the access authorization to the file or the directory of the user indicated by the UID information 114, the access authorization to the file or the directory of the user belonging to a group indicated by the GID information 115, and the access authorization to the user belonging to neither the UID information nor the GID information and it may include the information to indicate read availability, write availability, and execution availability to the file or the directory with respect to the user indicated by the UID information 114, the group indicated by the GID information 115, and the user belonging to neither the UID information nor the GID information, respectively.

The ACL 116 is the information to indicate an address of the storage area in which ACL information 121 with respect to the directory or the file is stored, and if the storage area indicated by the ACL 116 is referred, the ACL information 121 with respect to the file or the directory can be referred. In the ACL information 121, the UID 119 and a flag 120 indicating the access authorization to the file or the directory of the user indicated by this UID 119 are registered in connection with each other. As the flag 120, the information to indicate read availability, write availability, and execution availability of the file or the directory is taken as an example. In the meantime, in the ACL information 121, the GID and the flag indicating the access authorization for the user belonging to the group indicated by this GID may be registered in connection with each other. Thus, in the ACL information 121, the access authorization information of the user identified by the UID and the GID can be also registered other than the UID information 114 and the GID information 115.

The disk block address 117 is the information indicating a block address within the storage system of the old A company 104A, in which the data of this file or the directory is actually stored.

In the meantime, the data of the sub file system of the old B company also has the same structure as the data of the sub file system of the old A company shown in FIG. 4, and this data is stored in the storage system of the old B company 104B.

Figure 5:
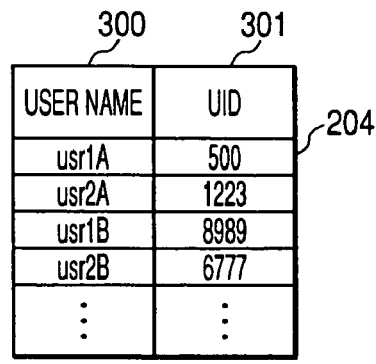
FIG. 5 illustrates an example of a UID management table.

FIG. 5 illustrates an example of the UID management table 204 stored in the external storage 203 that is connected to the user management server 100C. In the UID management table 204, a user name 300 of a user using the file sharing system and a UID 301 of this user are registered in connection with each other. The UID management table 204 shown in FIG. 5 is an example of the UID management table 204 in the file sharing system after integration, so that a user name of a user of the file sharing system after integration and a user side UID (a new UID) of this user are related in this UID management table 204. The CPU 201 of the user management server 100C may execute the user management server program 206 and referring to the UID management table 204, the CPU 201 may translate the user name received from the client 101C into a new UID corresponding to this user name.

Figure 6:
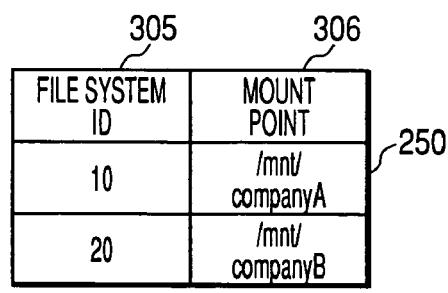
FIG. 6 illustrates an example of a file system ID table.

FIG. 6 illustrates an example of the file system ID table 250 stored in the management storage system 104C of the file sharing system after integration. In the file system ID table 250, a file system ID 305 as the identifier of the sub file system included in the file sharing system after integration and a mount point 306 of this sub file system are registered in connection with each other. According to the example shown in FIG. 6, a file system ID "10" of the sub file system of the old A company, a mount point of the sub file system of the old A company, a file system ID "20" of the sub file system of the old B company, and a mount point of the sub file system of the old B company are registered in the file system ID table 250.

Figure 7:
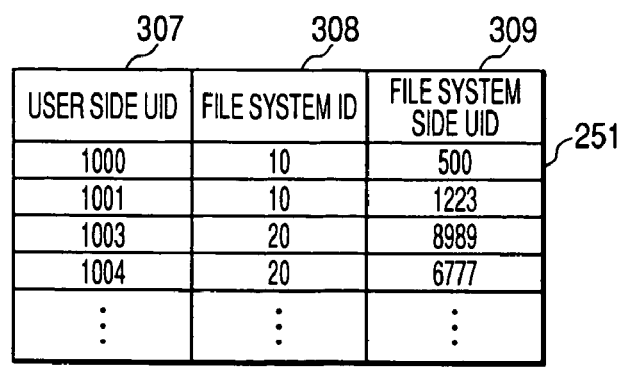
FIG. 7 illustrates an example of the UID mapping table.

FIG. 7 illustrates an example of the UID mapping table 251 stored in the management storage system 104C of the file sharing system after integration. In the UID mapping table 251, a user side UID (a new UID) 307, a file system ID 308 corresponding to this UID, and a file system side UID (an old UID) 309 are registered in conjunction with each other. The user side UID 307 is a UID registered in the new UID managed by the user management server 100C, namely, the UID registered in the UID management table 204. On the other hand, the sub file system of the old A company and the sub file system of the old B company are managed by using the old UID before integration (namely, the file system side UID), so that the file system side UID 309 corresponding to the user side UID 307 is registered in the UID mapping table 251.

However, there is a possibility that the same file system side UIDs are used by different users between the sub file system of the old A company and the sub file system of the old B company and different file system side UIDs are given to the same users between the sub file system of the old A company and the sub file system of the old B company, so that in the UID mapping table 251, the file system ID 308 and the file system side UID 309 are related to the user side UID 307. As a result, the file system ID 308 registered in the UID mapping table 251 is the identifier of the sub file system, in which the corresponding file system side UID 309 is used.

Figure 8:
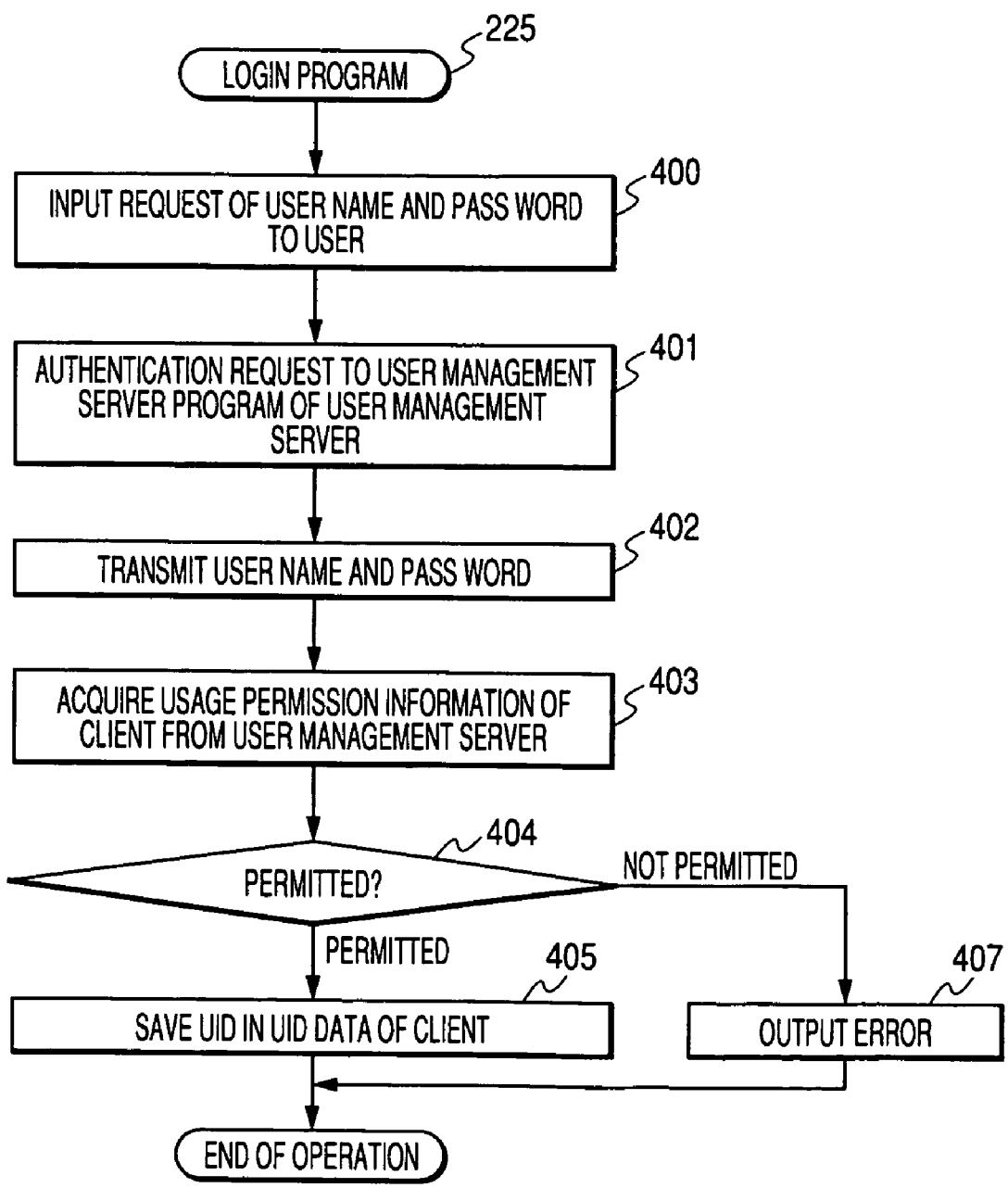
FIG. 8 illustrates an example of a login operation.

FIG. 8 illustrates an example of the login operation that is carried out between the client 101C and the user management server 100C. When the user logs on the client 101C, since the login program 225 of the client 101C outputs a screen requesting the user name and the pass word (step 400), the user may input the user name and the pass word. Receiving the inputted user name and pass word, the login program 225 may transmit the authentication request of the user to the user management server program 206 of the user management server 100C (step 401) and further, may transmit the inputted user name and password (step 402). Carrying out the authentication operation by using the received user name and pass word, the user management server program 206 may determine whether login to the client 101C is permitted to the user or not. Further, in the case of permitting login, referring to the UID management table 204 stored in the external storage 203, the user management server program 206 may retrieve the user name 300 that coincides with the received user name to acquire the UID 301 (the user side UID) corresponding to this user name. Then, the user management server program 206 may transmit the authentication result to the login program 225 of the client 101C, further, in the case of permitting login of the user, the user management server program 206 may further transmit the user side UID using the UID management table 204 to the login program 225 of the client 101C. The login program 225 may receive the authentication result from the user management server program 206, and if the login of the user is permitted, it may receive the user side UID there from (step 403). Then, the login program 225 may determine whether or not login is permitted on the basis of the information received from the user management server program 206 (step 404), and when the login is permitted, recording the user side UID received from the user management server program 206 in the memory area 224 that has been secured in advance in the memory 223 (step 405), the login program 225 may terminate the operation. Hereinafter, when the access request to the file system after integration is issued from this client 101C to the file sharing server 102C, the user side UID recorded in the memory area 224 is used. On the other hand, when login is not permitted, the login program 225 may output an error message (step 407) to terminate the operation.

Figure 9:
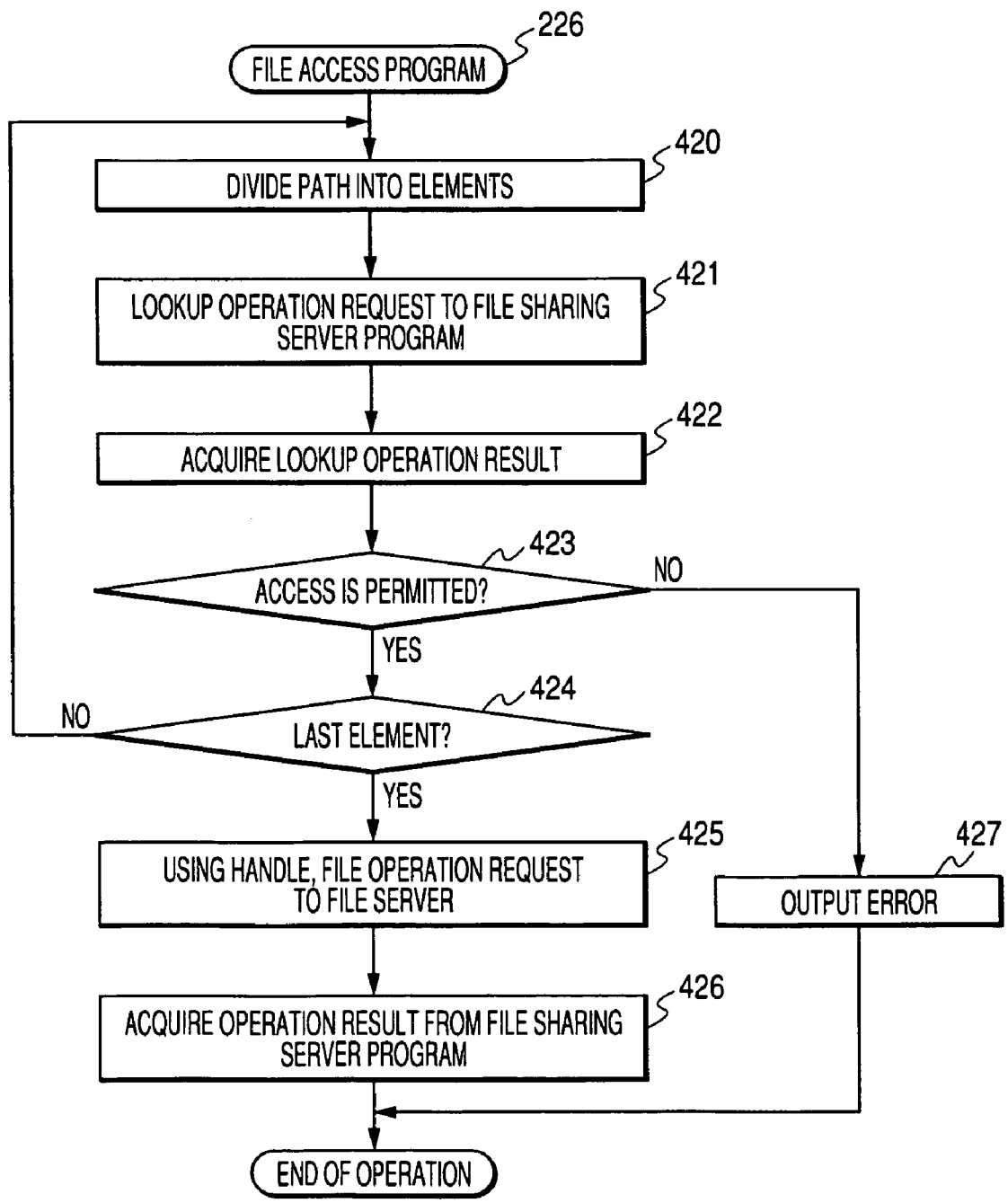
FIG. 9 illustrates an example of the operation of a file access program.

FIG. 9 illustrates an example of the operation that is carried out by executing the file access program 226 of the client 101C.

The file access program 226 may receive the path name of the file or the directory of the access target and the access request indicating the content of the operation to be executed by file sharing server 102C for this file or this directory from the user. As the access request, a [create request] for creating a file, a [mkdir request] for creating a directory, a [setattr request] for changing an attribution of the file or the directory, a [stat request] for acquiring the current attribution of the file or the directory, a [readdir request] for acquiring the current content of the directory, a [write request] for writing the data in the file, and a [read request] for reading the data from the file or the like may be considered. In this case, using an example that the file access program 226 receives [/company A/a/b.doc] as a path name, the operation hereinafter will be described.

Receiving path name, the file access program 226 may divide the path into elements and may take out the elements from a head in order (step 420). Here, the element of the path indicates a portion of the path name that is segmented by [/]. If the received path name is [/company A/a/b.doc], at first, the client 101C may take out a portion of [company A] (namely, the element of the path) in the path name.

Then, with respect to the taken-out path element, the client 101C may request the Lookup operation from the file sharing server program 244 of the file sharing server 102C (step 421). In this case, the file access program 226 may transmit the Lookup operation request including the user side UID stored in the memory area 224 and the elements of the path taken out in the step 420 to the file sharing server program 244.

The details of the Lookup operation are described later, however, in this Lookup operation, the UID information 114, the GID information 115, the ACL information 121 or the like and the value of the file handle are acquired with respect to the element of the path of the Lookup operation target; the values of the file system side UID included in the UID information 114, the GID information 115, and the ACL information 121 or the like are translated into the value of the user side UID; and then, these information after integration and the file handle are returned to an origin of the Lookup operation request.

Receiving the result of the Lookup operation from the file sharing server program 244, the file access program 226 may check whether or not the access to the element of the path is permitted on the basis of the received UID information, the GID information, the ACL information and the UID data recorded in the memory area 224 (step 423). Then, if the access is permitted, the process proceeds to the step 424 and if the access is not permitted, outputting an error (step 427), the operation is terminated.

In the step 424, the file access program 226 may check whether or not the Lookup operation is terminated till the last element of the path with respect to the file or the directory of the access target. Here, the last element of the path is the element of the path, which is included in the path name that is received from the user by the file access program 226 and which is located at the most rear of the path name among the elements of the path indicating the file or the directory that has been already managed by the file system program 243. Accordingly, when the file access program 226 is receiving the [create request] with respect to [/company A/a/b.doc], since the file of [b.doc] is not created yet, [a] becomes the last element of the path. On the other hand, when the file access program 226 is receiving the [setattr request], the [start request], the [write request], and the [read request] or the like with respect to [/company A/a/b.doc], the file of [b. doc] has been already created and it is managed by the file system 243, so that [b.doc] becomes the last element of the path.

If the Look up operation is terminated till the last element of the path, the process proceeds to the step 425 and if the Lookup operation is not terminated, returning to the step 420, the path is divided into the elements and a next element is taken out. Here, the next element means the element of the path till the part that is segmented by the next [/], and in the above-described example (the example that the path name of the access target is [/company A/a/b.doc]), the next element of [company A] becomes [a].

In the step 425, the file access program 226 may transmit the file operation request to carry out the operation in accordance with the access request (the [create request], the [mkdir request], the [setattr request], the [stat request], the [readdir request], the [write request], and the [read request] or the like) that is received from the user to the file sharing server program 244. This file operation request may include file handle of the file or directory of the access target that is acquired by executing the processing from the step 422 to the step 424. In addition, a portion of the file operation request such as the [create request], the [mkdir request], and the [setattr request] further includes the user side UID recorded in the memory area 224. Then, the file access program 226 may receive a response to the file operation request from the file sharing server program 244 (step 426) and may output this response to terminate the operation.

Figure 10:
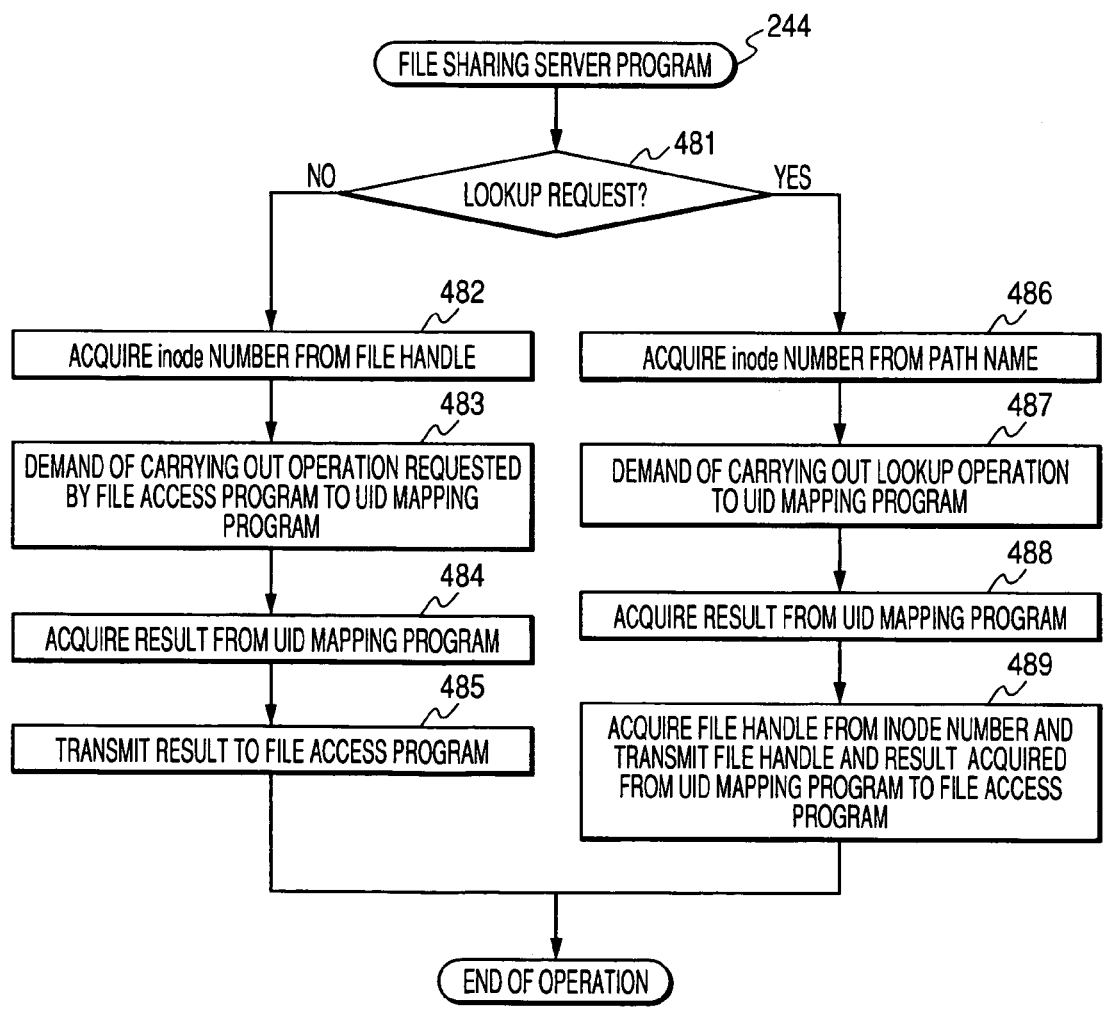
FIG. 10 illustrates an example of the operation of a file sharing server program.

FIG. 10 illustrates an example of the operation that is carried out by executing the file sharing server program 244 in the file sharing server 102C.

Receiving the operation request to the file or the directory from the file access program 226 of the client 10C, the file sharing server program 244 may determine whether or not the content of the operation request is execution of the Lookup operation (step 481). If the content of the operation request is not the Lookup operation, the operation hereinafter the step 482 is carried out, and if it is the Lookup operation, the operation hereinafter the step 486 is carried out.

In step 482, the file sharing server program 244 may obtain the inode number 111 from the file handle included in the request received from the file access program 226.

In this case, the file handle is a value generated by the file sharing server program 244 in order for the file sharing server program 244 to uniquely specify the file and the directory For example, the file handle is generated when the file sharing server program 244 inputs the inode number 111 in a function that has been determined in advance to obtain output of this function. Then, the file handle and the inode number have a correspondence function of 1:1. Accordingly, the file sharing server program 244 grasps the correspondence relation between the inode number 111 and the file handle, so that the file sharing server program 244 can obtain the inode number 111 from the file handle.

In the meantime, when the file sharing server program 244 requests the operation to the UID mapping program 245, the inode number 111 is used.

In the next place, the file sharing server program 244 may demand execution of the operation requested by the file access program 226 to the UID mapping program 245 (step 483). In this case, the file sharing server program 244 may also transfer the inode number 111 acquired in the step 482 to the UID mapping program 245 together with a parameter included in the request that is received from the file access program 226.

In step 484, the file sharing server program 244 may obtain a result of the demanded operation from the UID mapping program 245. Then, transmitting the obtained operation result to the file access program 226 (step 485), the operation is terminated. In the meantime, when the inode number 111 is included in the operation result that is received from the UID mapping program 245, the file sharing server program 244 may obtain a corresponding file handle from this inode number 111 and may transmit the file handle and the operation result to the file access program 226.

On the other hand, in the step 486, the file sharing server program 244 may obtain the inode number 111 from the element of the path included in the Lookup request received from the file access program 226. This can be obtained by referring to the directory entry 112.

Then, the file sharing server program 244 may demand execution of the Lookup operation to the UID mapping program 245 (step 487). In this case, by transferring the inode number obtained in the step 486 to the UID mapping program 245, the file sharing server program 244 may specify the target of the Lookup operation.

In step 488, the file sharing server program 244 may receive the Lookup operation result from the UID mapping program 245 (step 488), may obtain a file handle from the inode number that is included in the Lookup operation result, and may transmit the obtained file handle and the Lookup operation result received in the step 488 to the file access program 226 (step 489) to terminate the operation.

Figure 11:
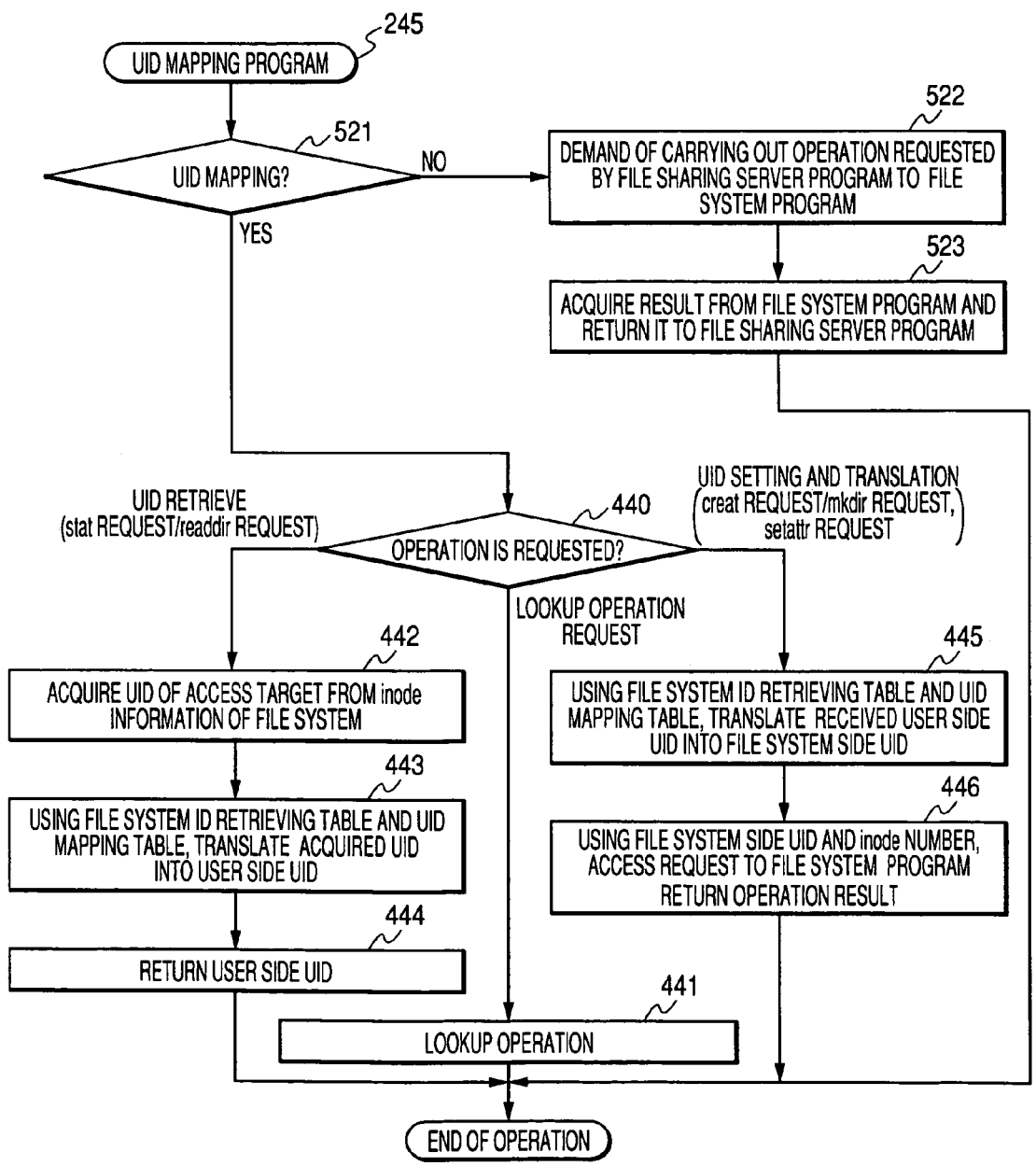
FIG. 11 illustrates an example of the operation of a UID mapping program.

FIG. 11 illustrates an example of the operation that is carried out by executing the UID mapping program 245 in the file sharing server 102C.

Receiving the operation request to the file or the directory from the file sharing server program 244, the UID mapping program 245 may determine whether or not translation of the UID is necessary for this operation (step 521). This can be determined from the content of the operation request that is received from the file sharing server program 244.

When the translation of the UID is not necessary, the UID mapping program 245 may transmit the operation request received from the file sharing server program 244 to the file system program 243 (step 522). Then, the UID mapping program 245 may obtain an operation result from the file system program 243 and may return it to the file sharing server program 244 (step 523).

Here, the case that the UID translation is not necessary means the case that, for example, the file operation request issued from the file access program 226 to the file sharing server program 244 is the read request and the write request to the file. In this case, the UID mapping program 245 may transfer the read request and the write request to the file system program 243.

Receiving the read request and the write request, the file system program 243 may specify the file of the access target on the basis of the inode number 111 (namely, the inode number 111 obtained by the file sharing server program 244 in the step 482 of FIG. 10) included in the read request and the write request, may carry out the read operation or the write operation to the specified file, and may return the operation result to the UID mapping program 245. Then, the UID mapping program 245 may return the operation result that is received from the file system program 243 to the file sharing server program 244 (the step 523). In the meantime, the file system program 243 can access the data of the file or the directory of the access target by acquiring the inode information 118 from the inode number 111.

On the other hand, when the translation of the UID is necessary, the processing on and after the step 440 will be carried out. The case that the translation of the UID is necessary means the case that the UID mapping program 245 receives the [create request], the [mkdir request], the [setattr request], the [stat request], the [readdir request], and the [Lookup operation request] or the like from the file sharing server program 244.

In the step 440, the UID mapping program 245 may check the content of the operation that is requested by the file sharing server program 244.

Retrieving the UID information 114, the GID information 115, the ACL 116, and the ACL information 121 or the like stored in the inode information 118 of the file system on the basis of the [stat request] and the [readdir request], if the content of the operation includes the operation to obtain these information, the processing on and after the step 442 will be carried out.

On the other hand, if the operation content is the Lookup operation, the Lookup operation is carried out (the step 441). The details of the Lookup operation will be described later with reference to FIG. 12.

If the content of the operation includes the operations to newly set the UID information 114, the GID information 115, and the ACL 116 to the inode information 118 of the file system, to newly set the ACL information 121 to the inode information 118 of the file system, to change the UID information 114, the GID information 115, and the ACL 116 that have been already set in the inode information 118, and to change the ACL information 121 that has been already set on the basis of the [create request], the [mkdir request], and the [setattr request] or the like, the processing on and after the step 445 will be carried out.

In the step 442, at first, referring to the inode information 118 of the directory or the file by using the inode number 111 of this directory or this file of the access target received from the file sharing server program 244, the UID mapping program 245 may obtain the UID information 114 of this directory or this file. In the meantime, in this time, not only the UID information 114 but also the GID information 115 and the ACL information 121 may be obtained.

In the next place, in the step 443, the UID mapping program 245 may translate the value of the file system side UID included in the UID information 114, the GID information 115, and the ACL information 121 obtained in the step 442 into the value of the user side UID.

Upon this translation operation, the UID mapping program 245 may obtain a mount point of the sub file system to which the file or the directory indicated by the inode number 111 belongs by referring to the directory entry 112 using this inode number 111. Then, the UID mapping program 245 may obtain a file system ID 305 of the sub file system to which the directory of the file of the operation target belongs by referring to the file system ID table 250 using this mount point. Further, the UID mapping program 245 may obtain a value of the user side UID 307 corresponding to the value of the file system side UID by retrieving the UID mapping table 251 using the obtained file system ID 305, the value of UID information, GID information, and the file system side UID included in ACL information obtained in the step 442.

Then, in the step 444, the UID mapping program 245 may return the UID information, the GID information, and the ACL information of the directory or the file of the operation target including the user side UID after integration to the file sharing server program 244.

On the other hand, in the step 445, the UID mapping program 245 may translate the value of the user side UID (the user side UID stored in the memory area 224 of the client 101C) that is received from the file sharing server program into the value of the file system side UID.

In this case, referring to the directory entry 112 by using the value of the inode number 111 that is received from the file sharing server program 244, the UID mapping program 245 may specify a mount point of the sub file system to which the directory or the file of the operation target belongs. Further, the UID mapping program 245 may obtain a file system ID of this sub file system from the file system ID table 250 by using the obtained mount point. Then, the UID mapping program 245 may retrieve the UID mapping table 251 by using the obtained file system ID and the user side UID received from the file sharing server program to obtain a value of the file system side UID corresponding to this user side UID.

Next, by using the obtained file system side UID and the inode number 111 received from the file sharing server program 244, the UID mapping program 245 may issue the access request for carrying out the operation designated by the file sharing server program 244 to the file system program 243 and receiving the operation result from the file system program 243, the UID mapping program 245 may return this operation result to the file sharing server program 244 (step 446).

In the meantime, receiving the access request from the UID mapping program 245, the file system program 243 may create a new file (or a new directory) if the content of the access request is, for example, the [create request] (or the [mkdir request]) and may register the value of the file system side UID received from the UID mapping program 245 with the inode information of this file (or the directory) as the UID information 114 of the inode information 118. Then, the file system program 243 may return the inode number 111 of this new file or the new directory to the UID mapping program 245.

In addition, if the content of the access request is the [setattr request], the file system program 243 may refer to the inode information 118 of the file or the directory that is designated by the inode number 111 received from the UID mapping program 245 and may change the UID information 114 of this inode information 118 into the value of the file system side UID received from the UID mapping program 245. Then, the file system program 243 may return a notice about termination of this operation to the UID mapping program 245.

Figure 12:
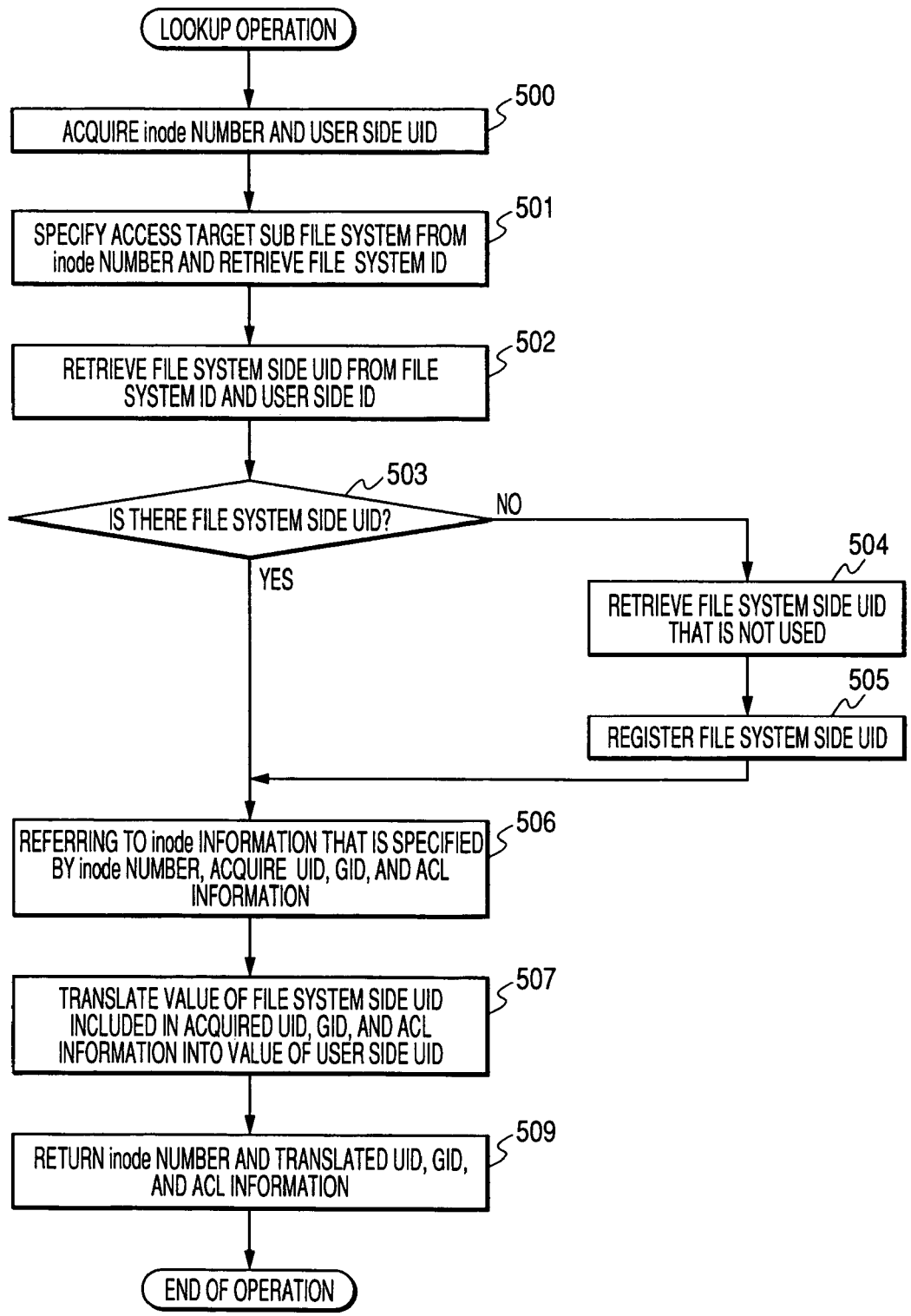
FIG. 12 illustrates an example of the Lookup operation.

FIG. 12 illustrates an example of the Lookup operation that is carried out by the UID mapping program 245. The UID mapping program 245 may obtain the inode number 111 of the Lookup operation target and the user side UID stored in the memory area 224 of the client 101C from the file sharing server program 244 (step 500).

Next, the UID mapping program 245 may check the directory entry 112 by using the inode number 111, may obtain a mount point, may retrieve the file system ID table 250 by using this mount point, and may obtain an ID of the sub file system to which the file or the directory of the Lookup operation target belongs (step 501).

Further, by using an ID of the file system acquired in the step 501 and the user side UID received from the file sharing server program 244, the UID mapping program 245 may retrieve the UID mapping table 251 and may retrieve the file system side UID in connection with this user side UID (step 502). Then, the UID mapping program 245 may check if the file system side UID in connection with the user side UID received from the file sharing server program 244 is registered in the UID mapping table 251 or not (step 503), and as a result of retrieving, if the file system side UID is found, the UID mapping program 245 may carry out the processing on and after the step 506, and if it is not found, the UID mapping program 245 may carry out the processing on and after the step 504.

In the step 503, the case that the file system side UID of the retrieving target is not registered in the UID mapping table 251 means the case that the user identified by the user side UID obtained in the step 500 accesses the sub file system identified by the file system ID obtained in the step 501 for the first time. In other words, for example, the case that the user belonged to the old A company accesses the file or the directory belonging to the sub file system of the old B company by using the client 101C for the first time is equivalent to this case. In this case, in the sub file system of the old B company, since the file system side UID of the user belonged to the old A company is not managed, the UID mapping program 245 may create the file system side UID in the sub file system of the old B company for the user of the old A company and may register this in the UID mapping table 251. This operation is equivalent to step 504 and step 505.

In other words, in the step 504, retrieving the UID mapping table 251, the UID mapping program 245 may select a value of the file system side UID that is different from file system side UID in connection with file system ID obtained in the step 501. In other words, in the sub file system identified by the file system ID obtained in the step 501, the UID mapping program 245 may select a value of the file system side UID that has not been used yet.

Next, in the step 505, the UID mapping program 245 may register the file system side UID selected by the step 504 in the UID mapping table 251 in connection with the file system ID obtained in the step 501 and the user side UID obtained in the step 500.

Then, in the step 506, the UID mapping program 245 may obtain the inode information 118 that is specified by the inode number 111 obtained in the step 500 and further, may obtain the corresponding ACL information 121 from the inode information 118.

Then, the UID mapping program 245 may translate the values in the UID information 114 and the GID information 115 in the obtained inode information 118 and the value of the file system side UID that is included in the obtained ACL information 121 into the value of the user side UID (step 507).

This translation operation is carried out in such a manner that the UID mapping program 245 retrieves the UID mapping table 251 by using the file system ID obtained in the step 501 and the value of the file system side UID included in the information obtained in the step 506 to obtain the value of the corresponding user side UID.

Then, in step 509, the UID mapping program 245 may return the inode number 111, the UID information having the value of the user side UID as the UID, the GID information, and the ACL information obtained in the step 506 and the step 507 to the file sharing server program 244 to terminate the operation.

Figure 13:
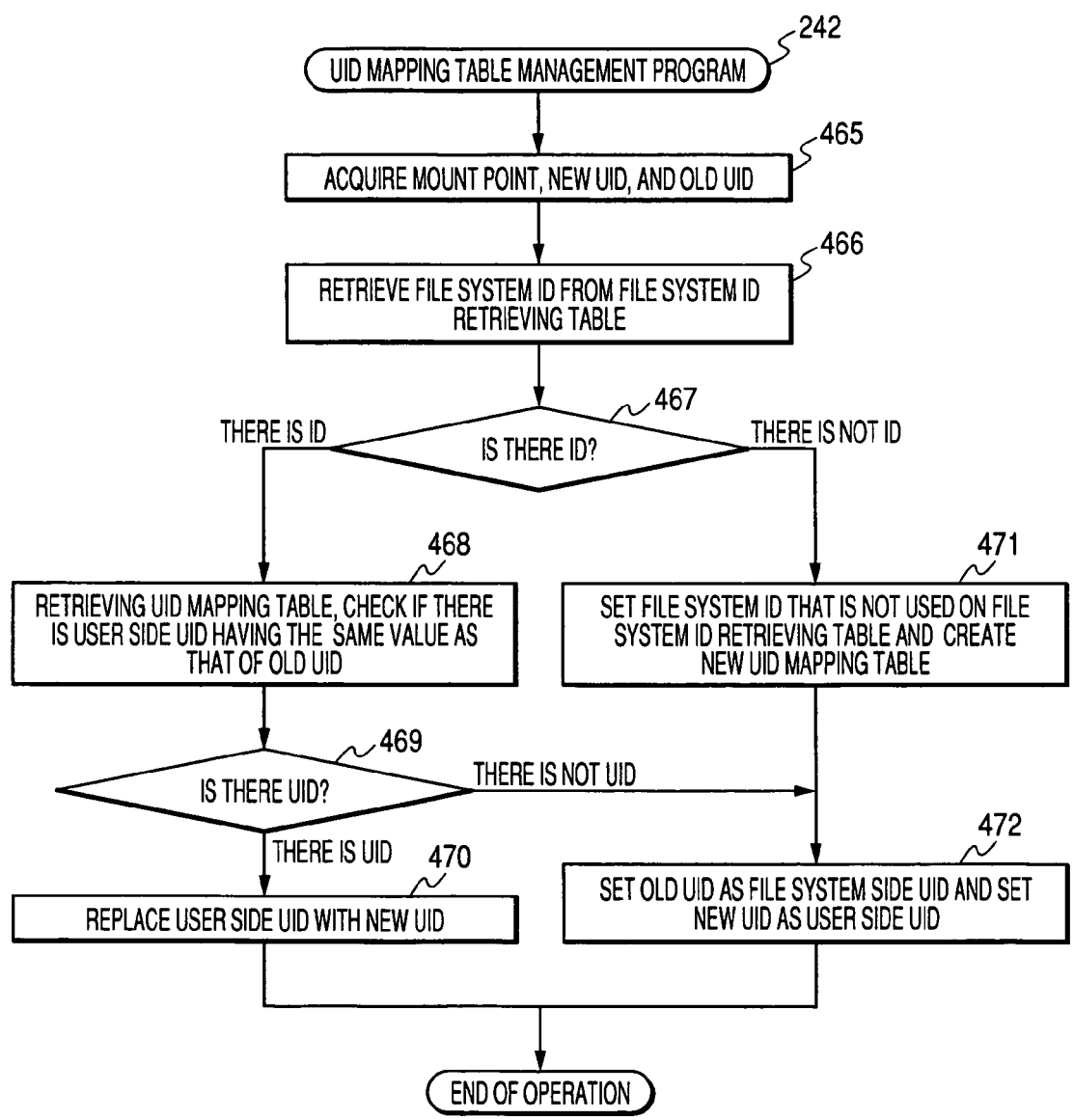
FIG. 13 illustrates an example of the operation of a UID mapping table management program.

FIG. 13 illustrates an example of the operation that is carried out by executing the UID mapping table management program 242 of the file sharing server 102C. The UID mapping table management program 242 is a program that is executed for creating and updating the UID mapping table 251. As shown in the step 505 of FIG. 12, the UID mapping table 251 is also updated by the UID mapping program 245 in the Lookup operation, however, the UID mapping table management program 242 is mainly executed when newly creating and updating the UID mapping table on the basis of the instruction from a manager or the like of the file sharing server 102C.

The UID mapping table management program 242 may obtain a mount point of the sub file system and new and old UIDs that are inputted in the file sharing server 102C from the manager or the like of the file sharing server 102C (step 465). Then, referring to the file system ID table 250, the UID mapping table management program 242 may retrieve the file system ID in connection with the mount point obtained in the step 465 (step 466), and it may check if the file system ID of the retrieving target has been already registered in the file system ID table 250 or not (step 467).

If the file system ID of the retrieving target has been already registered in the file system ID table 250, it can be said that the sub file system that is identified by this file system ID has been already unified to other sub file system. Therefore, the UID mapping table management program 242 may retrieve the UID mapping table 251 in order to check if the user side UID having the same value as that of the old UID obtained in the step 465 is registered in the UID mapping table 251 (step 468) to check with or without of this user side UID (step 469).

As a result of retrieving, when the user side UID having the same value as that of the old UID obtained in the step 465 is registered, the UID mapping table management program 242 may replace this user side UID registered in the UID mapping table 251 with the new UID obtained in the step 465 (step 470) to terminate the operation.

For example, as the case that the step 470 is carried out, the case that the user side UID is rewritten due to the further integration of the sub file systems or the like after the sub file systems are integrated once and the user side UID and the file system side UID are registered in the UID mapping table 251 is considered. In such a case, in the step 465, the value of the UID to be newly used as the user side UID is inputted in the file sharing server 102C as a new UID, and a value of the user side UID to be replaced with this new UID is inputted in the file sharing server 102C as an old UID.

When the user side UID having the same value as that of the old UID obtained in the step 465 is not found in the UID mapping table 251 in the step 469, the UID mapping table management program 242 may register the old UID obtained in the step 465 as the file system side UID 309 of the UID mapping table 251, the new UID obtained in the step 465 as the user side UID 307, and the file system ID found as a result of retrieving in the step 466 as the file system ID 308, respectively (step 472) to terminate the operation.

In the meantime, as a result of determination in the step 469, as the case that the step 472 is carried out, for example, the case that the manager inputs the UID used in the old file system as the old UID and the UID to be used in the file system after integration as the new UID in the file sharing server 102C in order to register the data in the UID mapping table 251 after the sub file systems are integrated and the file system ID and the mount point of the old sub file system are registered in the file system ID table 250 is considered.

When it is found that the file system ID of the retrieving target is not registered in the file system ID table 250 in the step 467, the UID mapping table management program 242 may select the file system ID that has not been used yet by the file system ID table 250 and may register this file system ID in the file system ID table 250 in connection with the mount point that is obtained in the step 465. Further, the UID mapping table management program 242 may prepare the new UID mapping table 251 (step 471). Then, the UID mapping table management program may register the old UID obtained in the step 465 as the file system side UID 309, the new UID obtained in the step 465 as the user side UID 307, and the file system ID selected in the step 471 as the file system ID 308 respectively in the UID mapping table 251 prepared in the step 471 (step 472) to terminate the operation.

In the meantime, as the case that the step 471 and the step 472 are carried out as a result of determination in the step 467, for example, the case that the file system before integration is newly registered in the file system ID retrieving table after the integration of the file system and the UID mapping table 251 is prepared is considered.

According to the above-described embodiments, even when the UID for identifying the user of the file system is updated due to integration of a plurality of file systems, the client 101C can access the file system after integration by using the new UID without changing the inode information 118 and the ACL information 121 or the like stored in the storage system 104 as the management data of the file system. Accordingly, it is not necessary to rewrite the management information of the inode information 118 and the ACL information 121 or the like recorded in the storage system 104 with respect to each of large amounts of files and directories recorded within the storage system 104 and each of many users using the file system after integration, so that it is possible to reduce a burden of operation given to the manager due to integration of the file systems and a management cost.

In addition, the file system referred to as a WORM (Write Once Read Many) file system includes a file system that does not accept the changing operation of the once-written data, not only the data of the file and the directory but also the management data of the file system such as the inode information 118 and the ACL information 121. According to such a file system, even if the UID is necessarily changed due to integration of the file system or the like, it is not possible to rewrite the inode information 118 and the ACL information 121 and conventionally, integration of the file system is difficult. However, according to the above-described embodiment, if the UID mapping table is newly prepared upon integration of the file system, without carrying out the changing operation of the management data of the file system written in the storage system once, the client can access the file system after integration by using a new UID. Accordingly, as compared to the conventional case, integration of the WORM file system can be easily performed.

In the meantime, according to the above-described embodiment, the case that the UID is changed due to integration of the file system is explained as an example, however, even if the UID is changed due to other cause, the present invention can be applied. In addition, according to the above-described embodiment, the case that the UID is changed is described as an example, however, even in the case that the GID is changed, the present invention can be applied as same as the case of the UID.

Figure 14:
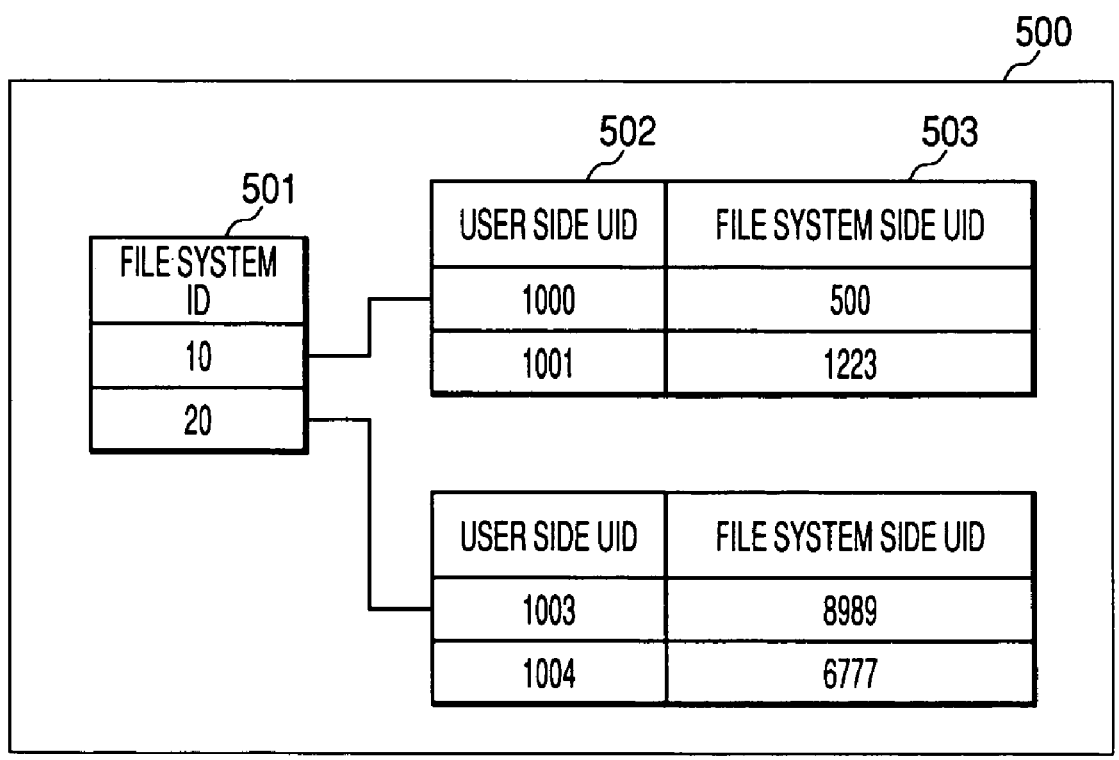
FIG. 14 illustrates other example of the UID mapping table.

In addition, a system of a table shown in FIGS. 5 to 7 is only an example, and the present invention can be applied to a table having the same information as the table shown in FIGS. 5 to 7 even if a format of the information is different. For example, FIG. 14 illustrates other example of the UID mapping table 251. According to the example of FIG. 14, a group of the user side UID and a group of the file system side UID are separately managed for each file system ID. In other words, according to the example of FIG. 14, a sub table is prepared for each file system ID, and in this sub table, a group of the user side UID in connection with this file system ID and a group of the file system side UID are registered. Then, a pointer relating the file system ID with the sub table corresponding to this ID represents a relation between them. Configuring the UID mapping table 251 as shown in FIG. 14, if the file system ID is specified, the region of the UID mapping table 251 to be retrieved is limited, so that the retrieving efficiency of the UID mapping table 251 can be enhanced due to the structure shown in FIG. 7.

What is claimed is:

1. A file server that is connected to a client computer and a storage storing data of a file system therein and receiving an access request to the data of the file stored in this storage from a client from the client computer, the file server comprising:
    a file system operation device adapted to manage the data of the file system that is stored in the storage, the storage including a first file system and a second file system;
    a file server operation device adapted to receive the access request to the file from the client, the access request including a first user identifier which identifies the client of the client computer and access information identifying an access destination file system; and
    a user identifier translation device adapted to carry out translation between a first user identifier for identifying a user of the file system, which is used by the client; and second user identifier or a third user identifier;
    wherein the user identifier translation device is adapted to translate the first user identifier, when the access destination file system identifies a first file system, to the second user identifier which identifies the user by the first storage by referring to a first mapping information stored in a management storage, where the first mapping information indicates a relation between an identifier used by the client computer and an identifier used in the first storage;
    wherein the user identifier translation device is adapted to translate the first user identifier, when the access destination file system identifies a second file system, to the third user identifier which identifies the user by the second storage by referring to a second mapping information stored in the management storage, where the second mapping information indicates a relation between an identifier used by the client computer and an identifier used in the second storage.

2. A file server coupled to a client computer comprising:
    an interface coupled to: a first storage storing data of a first file system therein, a second storage storing data of a second file system therein; and a management storage; and
    a processor adapted to receive an access request including a first user identifier which identifies a user by the client computer and access information identifying an access destination file system;
    wherein the processor is adapted to translate the first user identifier, when the access destination file system identifies a first file system, to a second user identifier which identifies the user by the first storage by referring to a first mapping information stored in the management storage, where the first mapping information indicates a relation between an identifier used by the client computer and an identifier used in the first storage;
    wherein the processor is adapted to translate the first user identifier, when the access destination file system identifies a second file system, to a third user identifier which identifies the user by the second storage by referring to a second mapping information stored in the management storage, where the second mapping information indicates a relation between an identifier used by the client computer and an identifier used in the second storage; and
    wherein the processor is adapted to check whether the access request is allowed or not by referring to the second user identifier or the third user identifier.

3. The file server according to claim 2, comprising a user identifier translation information store containing information to relate the first user identifier, the second user identifier, the third user identifier and file system identifier for use in performing the translate;
    where the processor is adapted to use the information within the user identifier translation information store, in performing the translate.

* * * * *